Jan. 27, 1970  W. SCHOLZ  3,492,417

SYNCHRONIZING SYSTEM FOR P.A.L. COLOR TELEVISION RECEIVER

Filed May 2, 1967

Inventor:
Werner Scholz
By: Spencer & Kaye
Attorneys

United States Patent Office 3,492,417

Patented Jan. 27, 1970

3,492,417

SYNCHRONIZING SYSTEM FOR P.A.L. COLOR TELEVISION RECEIVER

Werner Scholz, Hannover, Germany, assignor to Telefunken Patentverwertungsgesellschaft m.b.H., Ulm (Danube), Germany Filed May 2, 1967, Ser. No. 635,418
Claims priority, application Germany, May 13, 1966, T 31,157
Int. Cl. H04n 5/44
U.S. Cl. 178—5.4 4 Claims

ABSTRACT OF THE DISCLOSURE

The present invention relates to a color television receiver and to a circuit for synchronising a line-frequency switch in such a receiver by means of a received color burst the phase or frequency of which is reversed from line to line (alternating burst). The switch is controlled by an oscillator being synchronised or triggered by line frequency pulses, preferably line flyback pulses, and generating a switching voltage of half the line frequency. There is derived from the burst by phase or frequency detection a half-line-frequency identification signal which is phase-compared with the switching voltage in a phase-discriminator the output voltage of which is used for changing phase or frequency of the oscillator only in the event of incorrect phase of the switching voltage. The output voltage of the discriminator may additionally be used for actuating a color killer circuit.

Figure 1:
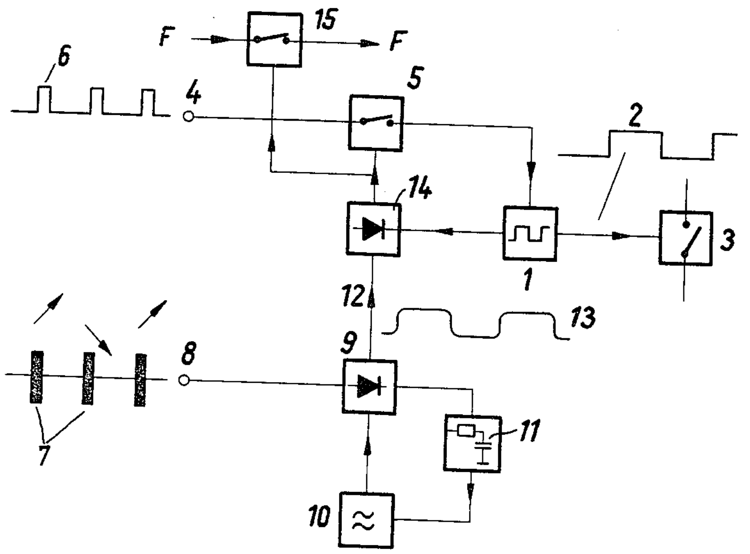

The invention relates to a color television receiver adapted to receive a color television signal including a color burst having its phase or frequency changed from line to line.

In a PAL or SECAM color television receiver a line-frequency electronic changeover switch is needed. The respective switchover moment of this switch can be adjusted by line frequency pulses, e.g. by line flyback pulses. To adjust the correct switching phase of this switch, it is well known that the phase of the color burst transmitted at the start of every line can be switched over from line to line, and from this a half-line frequency identification signal can be obtained for controlling the line-frequency switch.

For the interpretation of said switched over color burst it is well known that the color burst can be compared in a discriminator with a locally generated reference carrier of color carrier frequency and constant phase. The discriminator furnishes across a time constant network with high time constant compared with the duration of one line a control voltage for the oscillator and with low time constant a half-line frequency identification signal for synchronising the line-frequency switch.

To increase freedom from interference it is well known that this identification signal can be transformed with the aid of a circuit of high quality or an oscillator oscillating with half the line frequency into a sine-shaped signal. In the case of an input signal accompanied by a high level of noise the phase fluctuations of this sine signal are still so great that it cannot be used directly as the switching voltage for the switch. A further multivibrator controlled by line flyback pulses is therefore needed, and the sine-shaped identification signal is only used for determining the switching phase.

It is an object of the invention to modify said known circuit in such a way that the output voltage of the half-line-frequency oscillator may be used as a switching voltage for the line-frequency switch.

It is a further object of the invention to improve the freedom from interference in the operation of the line-frequency switch.

In accordance with the invention a color television receiver adapted to receive a color television signal including a color burst having its phase or frequency changed from line to line, includes a switch operated with line-frequency, means for deriving from said color burst by phase or frequency detection a half-line-frequency identification signal, an oscillator being synchronised or triggered by line-frequency pulses and oscillating at half the line-frequency, the output voltage of said oscillator serving as a switching voltage for said switch, means for feeding said identification signal and said output voltage of said oscillator to input terminals of a phase discriminator, and means for changing the phase or frequency of said oscillator by the output voltage of said discriminator only in the event of incorrect phase of the switching voltage.

The output voltage of the discriminator can with one embodiment of the invention in the event of an incorrect switching phase, stop the oscillator. After the discriminator output voltage has thereupon dropped to zero, the oscillator starts to oscillate again. This takes place until the correct switching phase is present. The discriminator output voltage may control a switch device which, in the event of the incorrect phase of the control voltage, keeps the line-frequency pulses away from the oscillator. Since the frequency of the then freely oscillating oscillator is never exactly equal to half the line-frequency, the phase of the switching voltage generated will vary until, in the correct phase, the suppression of the line frequency pulses ceases and synchronising starts again through these line-frequency pulses. In the event of an incorrect switching phase, the oscillator can be detuned by the discriminator output voltage to such a degree that it gets out of step. After the disappearance of the discriminator output voltage detuning the oscillator the oscillator is again synchronised by the line-frequency pulses. If this is done with the correct phase, the oscillator can continue oscillating undisturbed.

The oscillator can be a sine oscillator or a flip-flop controlled by the line flyback pulses. The discriminator output voltage can be used additionally for blocking the color channel i.e. actuating a color killer in the event of incorrect switching phase or in the event of absence of the received color burst switched in phase or frequency from line to line. Operation of such a color killer bases on the fact that a certain discriminator output voltage is only present when there are color bursts with phase or frequency switched over in line-frequency and correct switching phase.

By means of the invention, the following advantages are obtained. As the switching voltage-producing oscillator is synchronised in normal operation not by the identification signal but by the line flyback pulses which come chiefly from a flywheel-synchronised line-deflection circuit, freedom from interference is increased. The voltage at the output of the phase discriminator is so much integrated that noise interference of the identification signal no longer acts on the discriminator output voltage. As long as the oscillator is oscillating at the correct phase, the identification signal has no effect: If any change within the discriminator output voltage is moreover used for blocking the color channel, the advantage produced is that the color channel is blocked if the line-frequency switch has an incorrect switch phase, i.e. the reproduced picture were in any case unserviceable. There is the further advantage that the color channel is automatically blocked, not only in the event of the absence of the color burst but also in the event of an undesired received color television signal having no color burst with phase or frequency changed from line to line. The phase discriminator otherwise required for the color killer is therefore not needed if the invention is employed.

The invention is further explained below by reference to the drawing and by means of a practical example. FIG. 1 shows a wiring diagram of the invention, while in FIG. 2 a practical form of one embodiment of the invention is shown.

In FIG. 1 an oscillator 1, which furnishes a half-line-frequency switching voltage 2 for an electronic line-frequency switch 3, is synchronised from a terminal 4, across a gate 5, with line-frequency pulses 6, which come, for instance, from the line deflection circuit of the receiver. A color burst 7, the phase of which is switched by 90° from line to line is passed from a terminal 8 to a phase discriminator 9 and compared there with a reference carrier of color carrier frequency and constant phase generated in an oscillator 10. The discriminator 9 furnishes across a time constant network 11, with large time constant in relation to the duration of one line, the control voltage for the reactance stage of the oscillator 10 and at a line 12 a half-line-frequency identification signal 13, which is produced by the phase reversal of the color burst 7. The identification signal 13 and the output voltage of the oscillator 1 are compared with one another in a phase discriminator 14, whose output voltage acts on the gate 5 and moreover on a gate 15 (color killer) in the path of the color-channel F—F.

The method of operation of this circuit is as follows: As the oscillator 1 generates an oscillation of half the line-frequency and is synchronised by pulses with line-frequency, its output switching voltage 2 can have two phase positions, viz. 0° and 180°, in relation to the identification signal 13. One phase position is right and the other wrong.

If the oscillator 1 produces a switching voltage 2 with the correct switching phase, the phase discriminator produces a negative output voltage which keeps the gate 5 permeable, so that the oscillator 1 continues to be synchronised by the pulses 6. At the same time, the negative output voltage discriminator 14 controls the gate 15 so that it is permeable. Operation will be perfect and the identification signal 13 influenced by disturbances in the received signal has no influence on the oscillator 1 and the oscillator 1 is synchronised by the pulses 6 which are not liable to interference.

When the oscillator 1 generates a switching voltage 2 with incorrect switching phase, the phase discriminator 14 furnishes a positive output voltage, which controls the gate 5 impermeable so that the oscillator 1 is no longer synchronised. The positive voltage at the output of the phase discriminator 14 moreover controls the gate 15 impermeably and thus blocks in the desired manner the color channel F—F. Owing to the absence of synchronising, the phase of the switching voltage 2 varies until this switching voltage has the correct switch phase and at the output voltage of the phase discriminator 14 is again negative. This then again controls the gate 5 permeable, so that synchronising by the pulses 6 occurs again now with correct switching phase.

If a color signal is recived without a color burst reversed in phase, the output voltage of the phase discriminator 14 becomes zero. The output voltage of the phase discriminator 14 then controls in the desired manner the gate 15 so as to be impermeable, because the receiver would furnish an unserviceable picture. The gate 5 remains permeable, so that the oscillator 1 is further synchronized by the pulses 6.

The oscillator 1 is synchronised by the line-frequency pulses 6, which are preferably line flyback pulses, in such a way that the zero transits of the control voltage 2 fall in the line flyback period.

Figure 2:
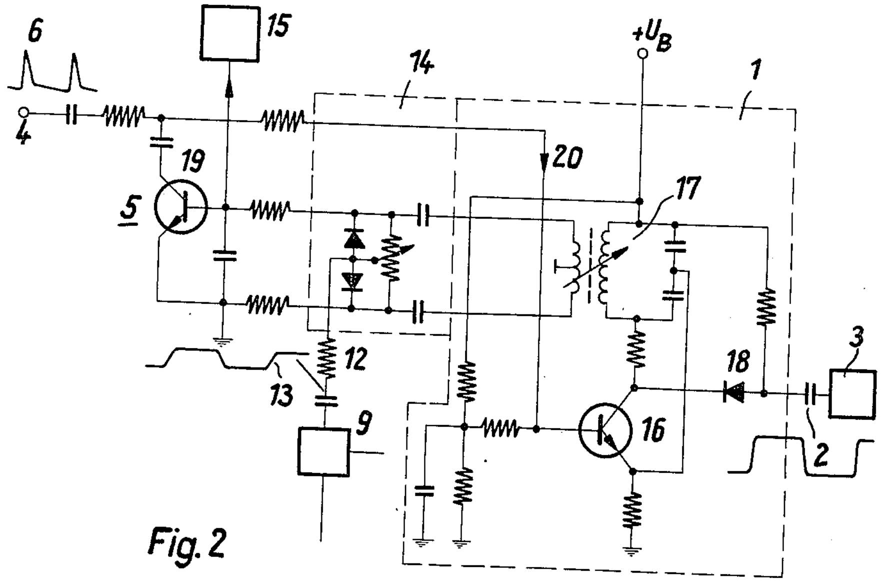

FIG. 2 shows a practical example that has been tested under working conditions. The oscillator 1 is formed by the transistor 16 and the oscillating circuit 17 tuned to half the line-frequency. Its output sine voltage is transformed by a diode 18 into the switching voltage 2. When the switching phase is correct, the output voltage of phase discriminator 14 occurring at the base of the transistor 19 acting as gate 5 is such that this transistor is nonconducting and the line-frequency pulses 6 effect the synchronising of the oscillator 1 across the line 20. In the event of an incorrect switching phase, a positive voltage appears at the base of transistor 19 which controls the transistor 19 conductive. The pulses 6 are now short circuited and no longer reach the base of the transistor 16, so that the phase position of the switching voltage 2 varies in the desired manner until it is again correct. If correct switching phase is reached the voltage at the base of the transistor 19, is again so negative that the transistor 19 is blocked and the pulses 6 again reach the base of the transistor 16.

What is claimed is:

1. In a color television receiver adapted to receive a color television signal including a color burst having its phase or frequency changed from line to line, a switch operated with line-frequency, means for deriving from said color burst by phase or frequency detection a half-line-frequency identification signal, an oscillator being synchronized or triggered by line-frequency pulses and oscillating at half the line-frequency, the output voltage of said oscillator serving as a switching voltage for said switch, means for feeding said identification signal and said output voltage of said oscillator to input terminals of a phase discriminator, and means for changing the phase or frequency of said oscillator by the output voltage of said discriminator only in the event of incorrect phase of the switching voltage.

2. In a color television receiver according to claim 1 means for stopping said oscillator by the output voltage of said phase discriminator in the event of incorrect phase of the switching voltage.

3. In a color television receiver adapted to receive a color television signal including a color burst having its phase or frequency changed from line to line, a switch operated with line-frequency, means for deriving from said color burst by phase or frequency detection a half-line-frequency identification signal, an oscillator being synchronized or triggered by line-frequency pulses and oscillating at half the line-frequency, the output voltage of said oscillator serving as a switching voltage for said switch, means for feeding said identification signal and said output voltage of said oscillator to input terminals of a phase discriminator, and means for changing the phase or frequency of said oscillator by the output voltage of said discriminator only in the event of incorrect phase of the switching voltage, said means for changing the phase or frequency of said oscillator including a switch device arranged within the path of the line-frequency pulses, said switch device being controlled nonconductive by the output voltage of the discriminator in the event of an incorrect switching phase so keeping away from said oscillator the line-frequency pulses.

4. In a color television receiver adapted to receive a color television signal including a color burst having its phase or frequency changed from line to line, means for deriving from said color burst by phase or frequency detection a half-line-frequency identification signal, an oscillator being synchronized or triggered by line-frequency pulses and oscillating at half the line-frequency, means for feeding said identification signal and said output voltage of said oscillator to input terminals of a phase discriminator, means for deriving from the output voltage of the discriminator a control voltage actuating a color killer circuit in the event of incorrect phase of said output voltage of said oscillator or in the event of the absence of the received color burst.

References Cited

FOREIGN PATENTS 1,164,466 9/1962 Germany.

ROBERT L. GRIFFIN, Primary Examiner

JOHN C. MARTIN, Assistant Examiner